(12) United States Patent
Sun et al.

(10) Patent No.: US 10,447,663 B2
(45) Date of Patent: *Oct. 15, 2019

(54) DECRYPTING NETWORK TRAFFIC ON A MIDDLEBOX DEVICE USING A TRUSTED EXECUTION ENVIRONMENT

(71) Applicant: SYMANTEC CORPORATION, Mountain View, CA (US)

(72) Inventors: Yuqiong Sun, Mountain View, CA (US); Daniel Marino, Los Angeles, CA (US); Susanta K. Nanda, San Jose, CA (US); Saurabh Shintre, Sunnyvale, CA (US); Brian T. Witten, Hermosa Beach, CA (US); Ronald A. Frederick, Mountain View, CA (US); Qing Li, Cupertino, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,950

(22) Filed: Jun. 28, 2018

(65) Prior Publication Data
US 2019/0253398 A1    Aug. 15, 2019

Related U.S. Application Data

(63) Continuation of application No. 15/894,619, filed on Feb. 12, 2018, now Pat. No. 10,044,691.

(51) Int. Cl.
*H04L 29/06* (2006.01)
*G06F 21/62* (2013.01)

(52) U.S. Cl.
CPC ...... *H04L 63/0435* (2013.01); *G06F 21/6263* (2013.01)

(58) Field of Classification Search
CPC .............. H04L 63/0435; G06F 21/6263
See application file for complete search history.

(56) References Cited

U.S. PATENT DOCUMENTS

2006/0248594 A1    11/2006   Grigorovitch et al.

FOREIGN PATENT DOCUMENTS

WO    2013074842 A1    5/2013

OTHER PUBLICATIONS

Naylor, David et al., "Multi-Context TLS (mcTLS): Enabling Secure In-Network Functionality in TLS", SIGCOMM '15 Proceedings of the 2015 ACM Conference on Special Interest Group on Data Communication, pp. 199-212, 14 pages.
(Continued)

*Primary Examiner* — Oleg Korsak
(74) *Attorney, Agent, or Firm* — Maschoff Brennan

(57) ABSTRACT

Decrypting network traffic on a middlebox device using a trusted execution environment (TEE). In one embodiment, a method may include loading a kernel application inside the TEE, loading a logic application outside the TEE, intercepting, by the logic application, encrypted network traffic, forwarding, from the logic application to the kernel application, the encrypted network traffic, decrypting, at the kernel application, the encrypted network traffic, inspecting, at the kernel application, the decrypted network traffic according to a sensitivity policy to determine whether the decrypted network traffic includes sensitive data, forwarding, from the kernel application to the logic application, filtered decrypted network traffic that excludes the sensitive data, processing, at the logic application, the filtered decrypted network traffic, forwarding, from the logic application to the kernel application, the filtered decrypted net-
(Continued)

work traffic after the processing by the logic application, and forwarding, from the kernel application, the encrypted network traffic.

20 Claims, 5 Drawing Sheets

(56) References Cited

OTHER PUBLICATIONS

Sherry, Justine et al., "BlindBox: Deep Packet Inspection over Encrypted Traffic", SIGCOMM '15 Proceedings of the 2015 ACM Conference on Special Interest Group on Data Communication, pp. 213-226, 14 pages.
Cisco, "Encrypted Traffic Analytics", Cisco public white paper, 2018, located at: https://www.cisco.com/c/dam/en/us/solutions/collateral/enterprise-networks/enterprise-network-security/nb-09-encrytd-traf-anlytcs-wp-cte-en.pdf, 9 pages.
U.S. Appl. No. 15/468,391, filed Mar. 24, 2017, titled "Systems and Methods for Verifying Connection Integrity", 88 pages.
Pires, R. et al., "Secure Content-Based Routing Using Intel Software Guard Extensions", Middleware '16, Jan. 1, 2017, 10 pages.
Portela, B., "A Provable Security Treatment of Isolated Execution Environments and Applications to Secure Computation", MAPi, DCC 2018, 207 pages.
Mokhtar et al., "X-Search: Revisiting Private Web Search using Intel SGX", HAL 2017, 13 pages.
Lind et al., "Glamdring: Automatic Application Partitioning for Intel SGX", 2017 USENIX Annual Technical Conference, Jul. 12-14, 2017, 15 pages.
Ferraiuolo. A. et al., "Komodo: Using Verification to Disentangle Secure-Enclave Hardware from Software", SOSP 17, Oct. 28, 2017, 19 pages.
United States Patent and Trademark Office; International Search Report and Written Opinion issued in PCT Application No. PCT/US18/65487; dated Feb. 22, 2019; 7 pages.
Mokhtar et al.; "X-Search; Revisiting Private Web Search using Intel SGX"; HAL Archives-Ouvertes; HAL ID: hal-01588883; Publication [online]; Dec. 2017; Located at: https://hal.inria.fr/hal-01588883/document; 13 pages.

DECRYPTING NETWORK TRAFFIC ON A MIDDLEBOX DEVICE USING A TRUSTED EXECUTION ENVIRONMENT

CROSS-REFERENCE TO A RELATED APPLICATION

This application is a continuation of U.S. application Ser. No. 15/894,619, filed Feb. 12, 2018, which is incorporated herein by reference in its entirety.

BACKGROUND

A middlebox device is a computer networking device that may be configured to intercept and decrypt network traffic, and then inspect and/or modify the network traffic. Middlebox devices are widely deployed in enterprise networks to improve network security and performance.

One potential problem with allowing a middlebox device to decrypt network traffic is the potential exposure of sensitive data that is included in the network traffic. This sensitive data that may be included in network traffic may be data related to criminal records, health records, tax records, financial records, educational records, government numbers (e.g., a social security number or a driver's license number), or user passwords. Further, it is common for certain individuals, such as network administrators, to be tasked with administering a middlebox device and to consequently have access to the network data that is decrypted on the middlebox device.

Therefore, although a middlebox device may generally improve network security and performance in an enterprise network, some enterprises are uncomfortable with the use of a middlebox device because of the potential exposure of sensitive data that is included in network traffic.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for decrypting network traffic on a middlebox device using a trusted execution environment may be performed, at least in part, by the middlebox device including one or more processors. The method may include (a) initializing the trusted execution environment (TEE), (b) loading a kernel application inside the TEE and a sensitivity policy inside the TEE, (c) sending, to a client device or a server device, attestation that the kernel application inside the TEE is authentic, (d) receiving at the kernel application inside the TEE, from the client device or the server device, a symmetric session key of an encrypted network session between the client device and the server device, (e) loading a logic application outside the TEE, (f) intercepting, by the logic application, encrypted network traffic from the client device that is directed to the server device, (g) forwarding, from the logic application outside the TEE to the kernel application inside the TEE, the encrypted network traffic, (h) decrypting, at the kernel application inside the TEE, the encrypted network traffic using the symmetric session key, (i) inspecting, at the kernel application inside the TEE, the decrypted network traffic according to the sensitivity policy to determine whether the decrypted network traffic includes sensitive data, (j) in response to determining that the decrypted network traffic includes sensitive data, filtering the decrypted network traffic to exclude the sensitive data, (k) forwarding, from the kernel application inside the TEE to the logic application outside the TEE, the filtered decrypted network traffic, (l) processing, at the logic application outside the TEE, the filtered decrypted network traffic, (m) forwarding, from the logic application outside the TEE to the kernel application inside the TEE, the filtered decrypted network traffic after the processing by the logic application outside the TEE, and (n) forwarding, from the kernel application inside the TEE, the encrypted network traffic to the server device.

In some embodiments, the method may further include (m.1) logging in a log, at the kernel application inside the TEE, the filtered decrypted network traffic that was forwarded to the logic application outside the TEE, (o) providing, from the kernel application inside the TEE, the log to the client device or to the server device, and (p) auditing, at the client device or the server device, the log to determine an extent to which the decrypted network traffic was exposed outside the TEE. In these embodiments, the processing at (1) may further include modifying the filtered decrypted network traffic, and the logging in the log at (m.1) may further include logging in the log the modifications made to the filtered decrypted network traffic that was forwarded to the logic application outside the TEE. Also, in these embodiments, the method may further include (m.2) encrypting, at the kernel application inside the TEE, the modified filtered decrypted network traffic, and the encrypted network traffic forwarded at (n) may include the modified filtered decrypted network traffic that was encrypted at (m.2).

In some embodiments, the method may further include (o) receiving, at the kernel application inside the TEE, an update to the sensitivity policy from the client device or the server device to modify what qualifies as sensitive data at the inspecting at (i).

In some embodiments, the sending at (c) may further include sending, to the client device or the server device, attestation that the sensitivity policy is authentic. In some embodiments, the kernel application may be loaded at (b) inside the TEE on the middlebox device, and the logic application is loaded at (e) outside the TEE on a separate second middlebox device, with an encrypted channel for secure communication between the two middlebox devices.

In some embodiments, the TEE may include a Software Guard Extension (SGX) enclave. In these embodiments, the initializing at (a) of the SGX enclave may include initializing, at the middlebox device, of the SGX enclave using an Intel® processor of the middlebox device that supports Intel® SGX instructions (e.g., a hardware-rooted SGX enclave). Alternatively, in these embodiments, the initializing at (a) of the SGX enclave may include initializing, at the middlebox device, of the SGX enclave using an OpenSGX simulator, or a Komodo monitor, that supports Intel® SGX instructions.

Also, in some embodiments, one or more non-transitory computer-readable media may include one or more computer-readable instructions that, when executed by one or more middlebox devices, cause the one or more middlebox devices to perform a method for decrypting network traffic on a middlebox device using a trusted execution environment.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Where a middlebox device is deployed in an enterprise network to improve network security and performance, one potential problem is the potential exposure of sensitive data in network traffic that is decrypted on the middlebox device. For example, it is common for certain individuals, such as network administrators, to be tasked with administering a middlebox device, and to consequently have access to the network data that is decrypted on the middlebox device. Some enterprises are therefore uncomfortable with the use of a middlebox because of potential exposure of sensitive data that is included in network traffic.

Some embodiments disclosed herein may enable decrypting network traffic on a middlebox device using a trusted execution environment (TEE). In particular, some embodiments may only allow decryption of encrypted network traffic by a kernel application that is executing in a TEE that has been initialized and attested to on the middlebox device. The kernel application may then inspect the decrypted network traffic to determine whether the decrypted network traffic includes sensitive data, and then only allow non-sensitive data in the decrypted network traffic to be exposed and processed outside of the TEE on the middlebox device. Because the sensitive data is maintained inside the TEE, and because individuals with access to the middlebox device, such as network administrators, are not able to access data inside the TEE, the middlebox device disclosed herein may be employed in an enterprise network to improve network security and performance without risking the potential exposure of sensitive data in network traffic that is decrypted on the middlebox device to individuals with access to the middlebox device, such as network administrators. Further, some embodiments disclosed herein may further enable logging of all data exposed outside the TEE, and any modifications to the exposed data, to enable auditing of activity by individuals with access to the middlebox device, such as network administrators.

Figure 1:
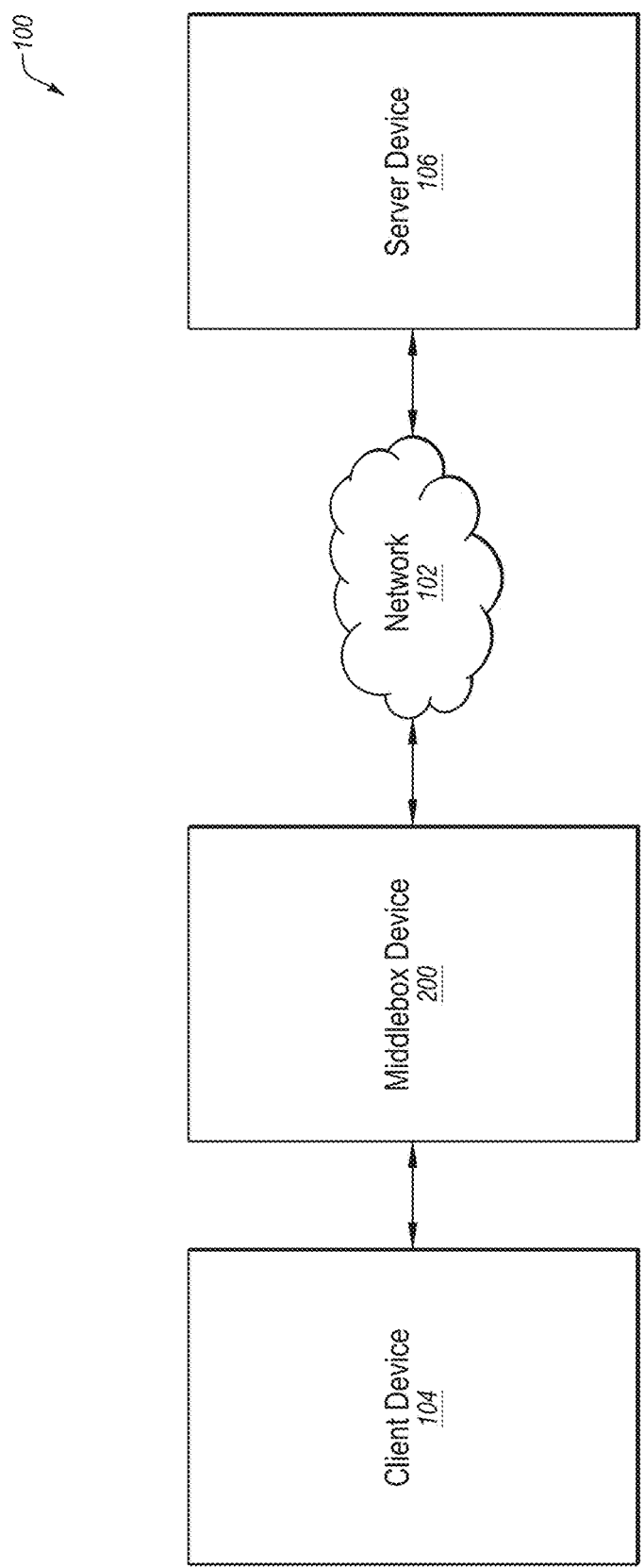
FIG. 1 illustrates an example system configured for decrypting network traffic on a middlebox device using a trusted execution environment.

Turning to the figures, FIG. 1 illustrates an example system 100 configured for decrypting network traffic on a middlebox device using a trusted execution environment (TEE). The system 100 may include a network 102, a client device 104, a server device 106, and a middlebox device 200.

In some embodiments, the network 102 may be configured to communicatively couple the client device 104, the middlebox device 200, and the server device 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
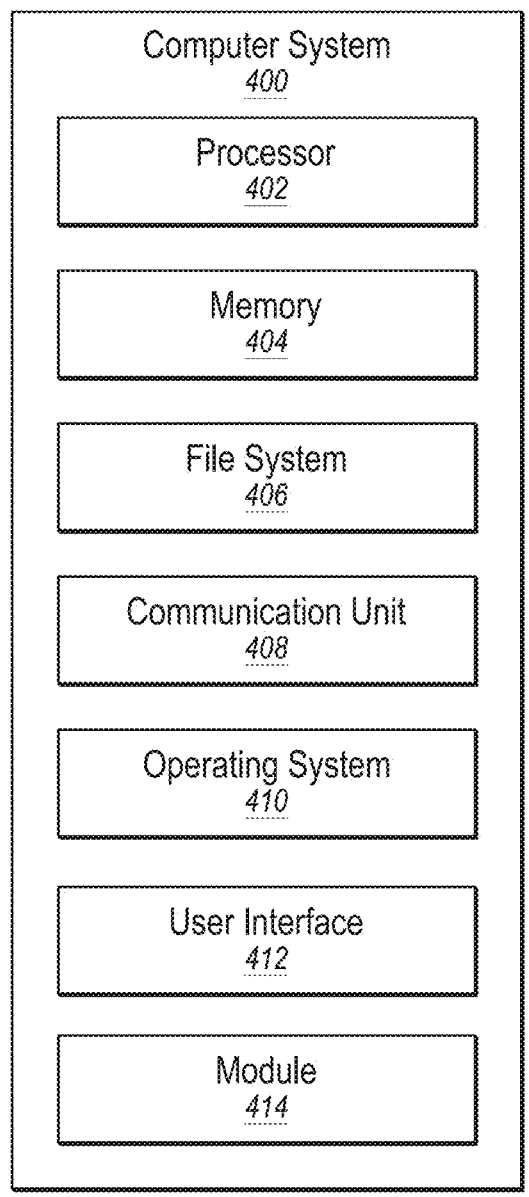
FIG. 4 illustrates an example computer system that may be employed in decrypting network traffic on a middlebox device using a trusted execution environment.

In some embodiments, the client device 104 may be any computer system capable of communicating over the network 102 and capable of functioning as a client in an encrypted network session, examples of which are disclosed herein in connection with the computer system 400 of FIG. 4. Similarly, in some embodiments, the server device 106 may be any computer system capable of communicating over the network 102 and capable of functioning as a server in an encrypted network session, examples of which are disclosed herein in connection with the computer system 400 of FIG. 4.

In some embodiments, the middlebox device 200 may be any computer system capable of communicating over the network 102 and capable of functioning as a middlebox device by intercepting and decrypting encrypted network traffic, as well as inspecting and/or modifying the network traffic prior to forwarding the encrypted network traffic to its original destination, examples of which are disclosed herein in connection with the computer system 400 of FIG. 4. In some embodiments, the middlebox device 200 may be employed by an enterprise that manages the network 102, the client device 104, and/or the server device 106, or that needs to protect sensitive data that is communicated in encrypted network traffic between the client device 104 and the server device 106, such as an employer who allows an employee to use a personal client device on the employer's enterprise network. In some embodiments, the middlebox device 200 may be configured to decrypt encrypted network traffic using a TEE, as discussed in greater detail below in connection with FIGS. 2A-2B and 3, in order to prevent sensitive data in the decrypted network traffic from being exposed outside the TEE to individuals who have access to the middlebox device 200, such as network administrators, or other individuals who maliciously obtain access to the middlebox device 200, such as purveyors of malware or hackers. The middlebox device 200 may further be configured to enable logging of all decrypted data exposed outside the TEE, and any modifications to exposed data, to enable auditing of activity by individuals with access to the middlebox device 200. In some embodiments, the middlebox device 200 may be, or may be part of, Symantec's SSL Visibility Appliance device, Symantec's ProxySG device, or Symantec's Advanced Secure Gateway (ASG) device.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, a separate network may be positioned between the middlebox device 200 and the client device 104. Further, it is understood that the network connections between the components illustrated in FIG. 1 (illustrated as left-right arrows) may be part of the network 102 or another network.

Figure 2:
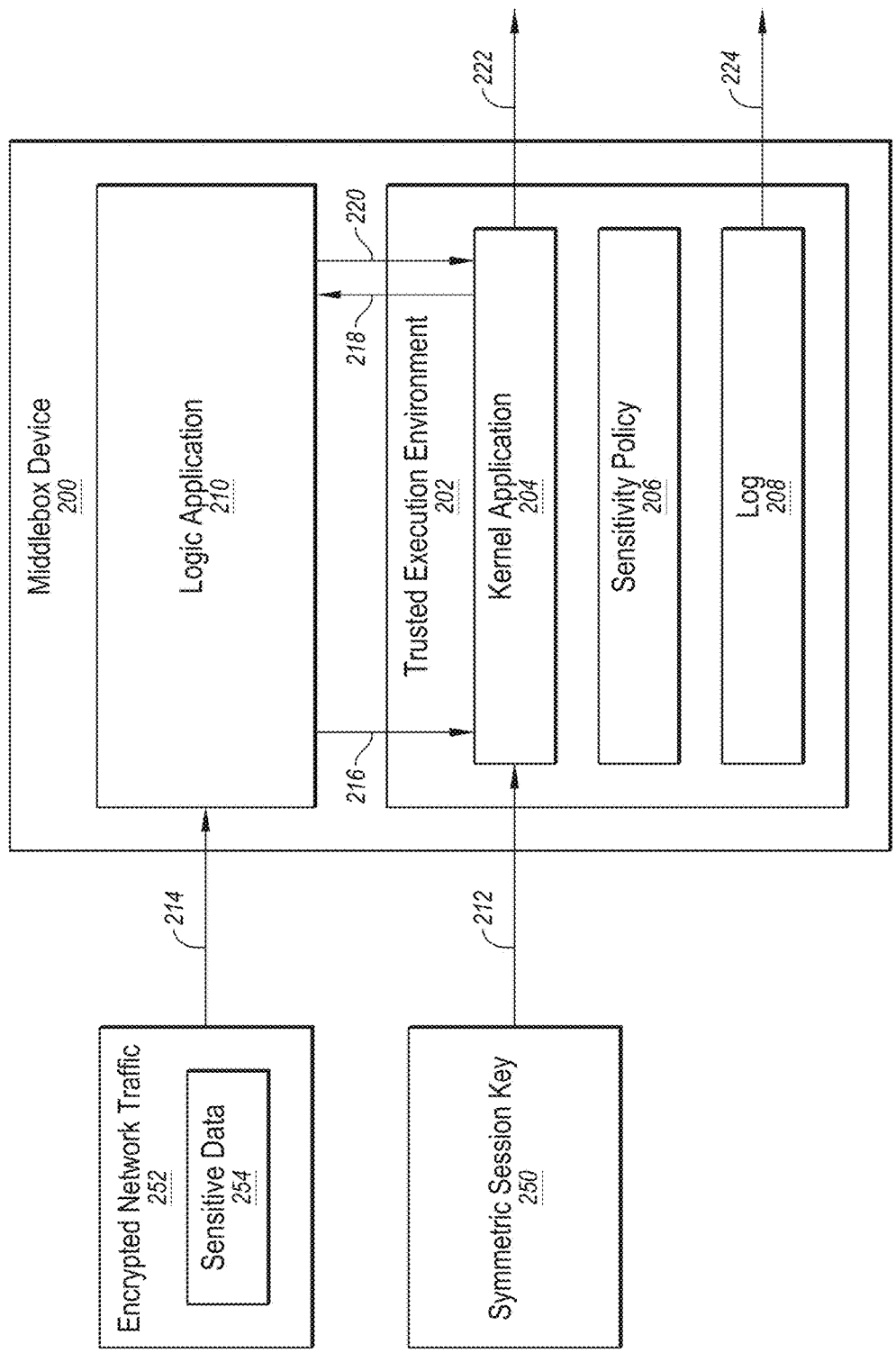
FIG. 2 illustrates the middlebox device of FIG. 1.

FIG. 2 illustrates the middlebox device 200 of FIG. 1. As disclosed in FIG. 2, the middlebox device 200 may include a Trusted Execution Environment (TEE) 202. In some embodiments, the TEE 202 may be a Software Guard Extension (SGX) enclave. Intel® Software Guard Extension (SGX) technology may be configured for application developers who are seeking to protect select code and data from disclosure or modification. Intel® SGX makes such protections possible through the use of SGX enclaves, which are protected areas of execution in memory. Application code can be put into an SGX enclave by special instructions and software made available to developers via the Intel® SGX SDK. The SDK is a collection of APIs, libraries, documentation, sample source code, and tools that allow software developers to create and debug applications enabled for Intel® SGX in C and C++. For example, an SGX enclave may be initialized using an Intel® processor of the middlebox device 200 that supports Intel® SGX instructions. Alternatively, an SGX enclave may be initialized using an OpenSGX simulator, or a Komodo monitor, that supports Intel® SGX instructions. Therefore, the TEE 202 may be initialized using an Intel® SGX platform or another non-Intel® platform that supports Intel® SGX instructions and provides Intel® SGX guarantees.

In some embodiments, the TEE 202 may be employed as a secure wrapper or container in which to execute a kernel application 204 and in which to store a sensitivity policy 206 and a log 208. The kernel application 204 may be configured as a relatively simple application that can be verified as authentic and may be configured for network traffic decryption, simple processing such as inspecting to filter out sensitive data according to the sensitivity policy 206, logging information in the log 208, and encryption or re-encryption. The sensitivity policy 206 may specify particular types of data (for use with pattern matching, for example) that should be considered to be sensitive data, such as data related to criminal records, health records, tax records, financial records, educational records, government numbers (e.g., a social security number or a driver's license number), or user passwords. Inversely, the sensitivity policy 206 may specify particular types of data that should not be considered to be sensitive data.

The middlebox device 200 may also be configured to execute, outside the TEE 202, a logic application 210. The logic application 210 may be configured as a relatively complex application, for example, that may be configured to include a protocol parser, a Layer 2-4 detector, administration policies, and complex Layer 7 detection logic. In some embodiments, the logic application 210 may be configured as any of a data loss prevention (DLP) system, an intrusion prevention system (IPS), an intrusion detection system (IDS), and a parental control system. The logic application 210 outside the TEE 202 cannot tamper with the kernel application 204 inside the TEE 202 due to the logic application 210 being outside the TEE 202 and due to the kernel application 204 being inside the TEE 202.

Example functionality of the middlebox device 200 of FIG. 2 will now be disclosed in connection with the network 102, the client device 104, and the server device 106 of FIG. 1.

During operation of the middlebox device 200, the middlebox device 200 may initialize the TEE 202 and then load the load the kernel application 204 and the sensitivity policy 206 inside the TEE 202, as well as loading the logic application 210 outside the TEE 202. Then, the middlebox device 200 may send, to the client device 104 and/or the server device 106, attestation that the kernel application 204 as well as the TEE 202 are authentic, in order to satisfy the client device 104 and/or the server device 106 that the TEE 202 and the kernel application 204 are secure, are the correct versions, and have not been tampered with. In some embodiments, code of the kernel application 204 may be made public to allow for inspection of the code, or may be vouched for by a trusted third party, to ensure that no malicious logic has been embedded in the kernel application 204.

After the client device 104 and/or server device 106 is satisfied that the TEE 202 and the kernel application 204 are secure, are the correct versions, and have not been tampered with (e.g., after the TEE 202 and the kernel application 204 are attested), and once the client device 104 and the server device 106 have established an encrypted network session between one another, the client device 104 and/or server device 106 may send, to the kernel application 204 inside the TEE 202, a symmetric session key 250 of the encrypted network session (as illustrated by arrow 212). The symmetric session key 250 may have been generated during a TLS session negotiation, for example, and may be shared with the kernel application 204 using a side-channel protocol without modifying the standard encrypted network session protocols (e.g., TLS protocols). The symmetric session key 250 may then be used by the kernel application 204 to decrypt encrypted network traffic 252 that is intercepted by the logic application 210 (as illustrated by arrow 214) while the encrypted network traffic 252 is traveling over the network 102 between the client device 104 and server device 106 during the encrypted network session. After intercepting the encrypted network traffic 252, the logic application outside the TEE 202 may forward the encrypted network traffic 252 to the kernel application 204 inside the TEE 202 (as illustrated by arrow 216).

Once the encrypted network traffic 252 arrives at the kernel application 204 inside the TEE 202, the kernel application 204 may decrypt the encrypted network traffic 252 using the symmetric session key 250 and then inspect (e.g., parse) the decrypted network traffic according to the sensitivity policy 206 to determine whether the decrypted network traffic includes sensitive data 254 (e.g., using pattern matching or more complex patterns and inspection primitives). For example, patterns may match on simple keywords, or (possibly restricted) regular expressions over the data fields of the protocol. Where the decrypted network traffic is determined to include sensitive data 254, the kernel application 204 may filter the decrypted network traffic in order to exclude the sensitive data 254 (e.g., by removing the sensitive data 254 from the decrypted network traffic, by redacting the sensitive data 254 from the decrypted network traffic, by masking the sensitive data 245 in the decrypted network traffic, etc.). The kernel application 204 may then forward the decrypted network traffic to the logic application 210 (or some portion or representation thereof, such as a computed intermediate data representation, such as a summarization) (as illustrated by arrow 218), where the logic application 210 may then process the decrypted network traffic, prior to forwarding it back to the kernel application 204 (as illustrated by arrow 220). The kernel application 204 may then record in the log 208 details regarding the decrypted network traffic (up to, and including, all decrypted network traffic that was exposed outside the TEE 202 and/or any modifications that the logic application 210 made to the decrypted network traffic).

Finally, after the processing by the logic application 210 and the logging by the kernel application 204, the encrypted network traffic 252 (e.g., the original copy if unmodified, or if some portion is modified, a re-encrypted copy of the modified portion merged with the original copy of the unmodified portion) may be forwarded by the kernel application 204 to its original destination (e.g., either the client device 104 or the server device 106) (as illustrated by arrow 222). The kernel application 204 may also provide the log 208 to the client device 104 and/or the server device 106 (as illustrated by arrow 224) to enable the client device 104 and/or the server device 106 to audit the log 208 to determine the extent to which the encrypted network traffic 252 was exposed outside the TEE 202 and/or modified outside the TEE 202.

Because the sensitive data 254, once decrypted, is maintained inside the TEE 202, and because individuals with access to the middlebox device 200, such as network administrators, are not able to access data inside the TEE 202, the middlebox device 200 may be employed in an enterprise network to improve network security and performance without risking the potential exposure of the sensitive data 254 to individuals with access to the middlebox device 200, such as network administrators. Further, the logging of all data exposed outside the TEE 202, and any modifications to the exposed data, may enable auditing of activity by individuals with access to the middlebox device 200.

Modifications, additions, or omissions may be made to the middlebox device 200 without departing from the scope of the present disclosure. For example, the middlebox device 200 may include additional components similar to the components illustrated in FIG. 2 that each may be configured similarly to the components illustrated in FIG. 2. Further, in some embodiments, the functionality of the middlebox device 200 may be spread across two or more separate middlebox devices, such as where the kernel application 204 is loaded in the TEE 202 on a first middlebox device, and the logic application 210 is loaded outside the TEE 202 on a separate second middlebox device, with a secure channel for secure communication between the two middlebox devices. Also, in some embodiments, the kernel application 204 may further inspect (e.g., parse) the decrypted network traffic according to a security policy to determine whether any of the decrypted network traffic can be considered secure, and can thus be forwarded by the kernel application 204 to its original destination (e.g., either the client device 104 or the server device 106) (as illustrated by arrow 222), without further processing by the logic application 210. For example, the security policy may employ a whitelist or a blacklist, may match on the protocol (e.g., port 80 or 8080), or may match on regular expressions over the data fields of the protocol (e.g., URL in HTTP traffic, certificate during the session setup, etc.) in order to determine whether the decrypted network traffic can bypass the processing by the logic application 210. In these embodiments, the kernel application 204 may inspect the decrypted network traffic according to a security policy prior to inspecting the decrypted network traffic according to the to the sensitivity policy 206.

Figure 3A:
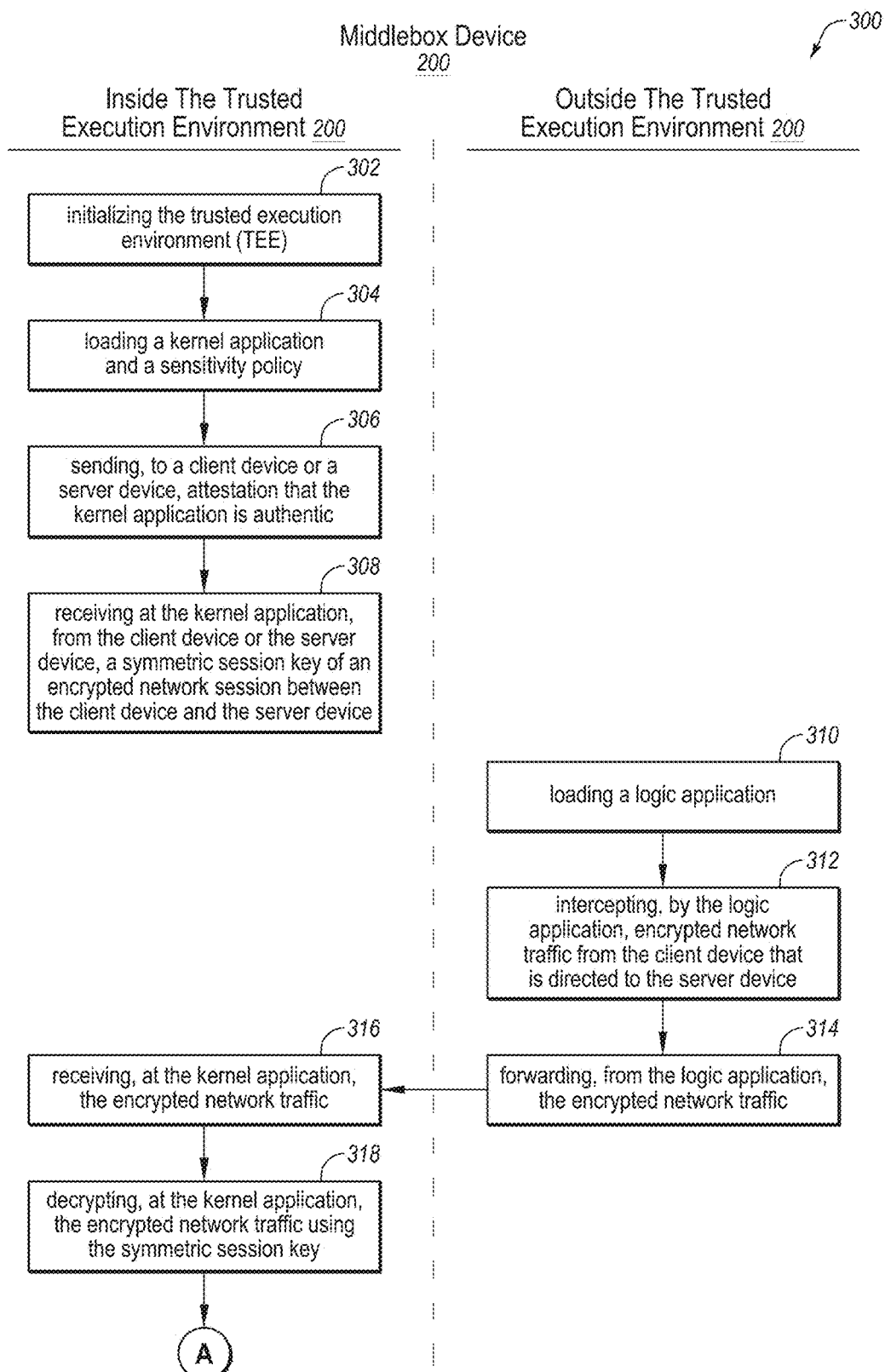
FIGS. 3A-3B are a flowchart of an example method for decrypting network traffic on a middlebox device using a trusted execution environment.
Figure 3B:
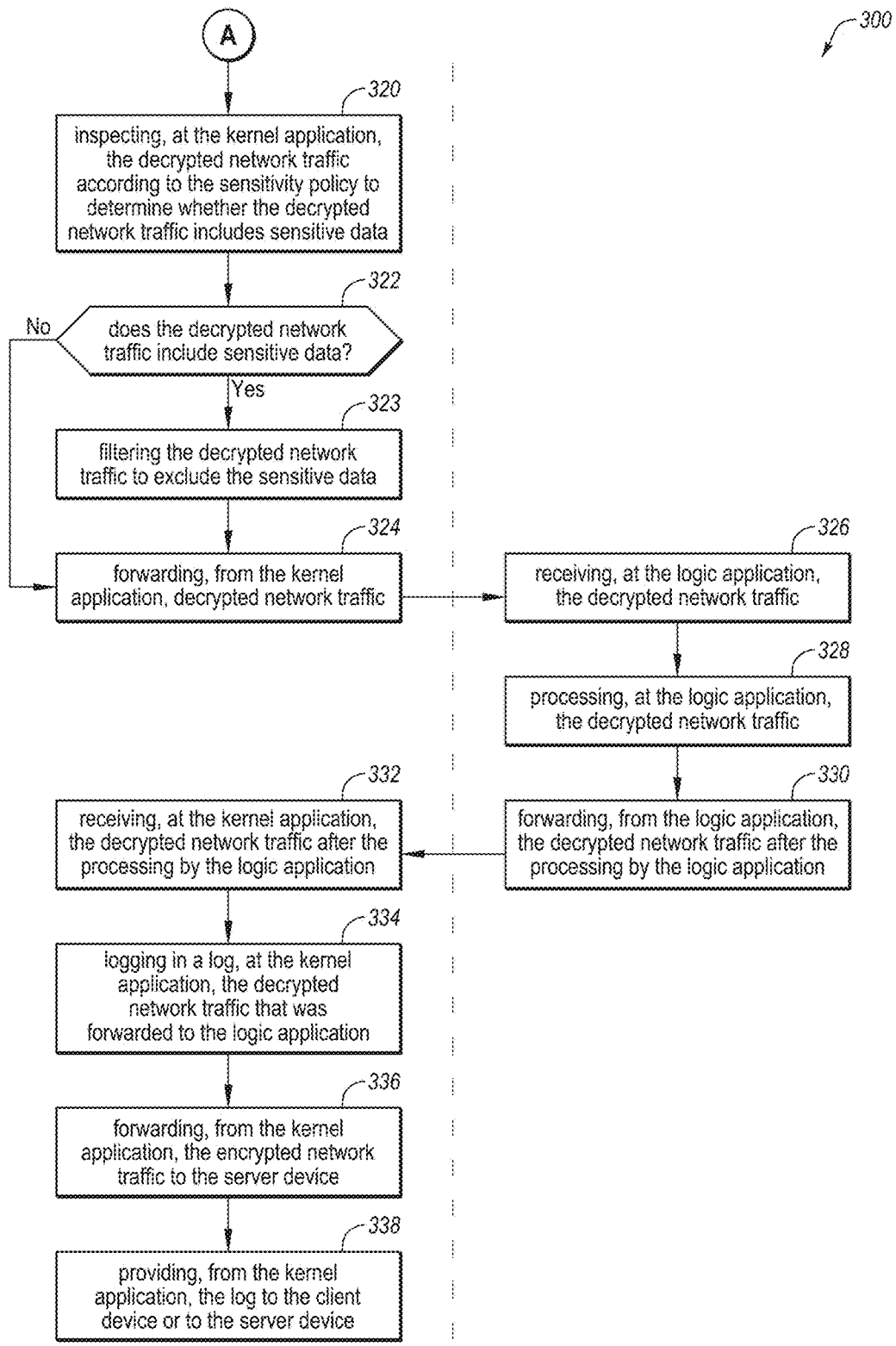

FIGS. 3A-3B are a flowchart of an example method 300 for decrypting network traffic on a middlebox device using a trusted execution environment. The method 300 may be performed, in some embodiments, by a device or system, such as by the TEE 202, the kernel application 204, and the logic application 210 of the middlebox device 200 of FIG. 2. In these and other embodiments, the method 300 may be performed by one or more processors based on one or more computer-readable instructions stored on one or more non-transitory computer-readable media. The method 300 will now be described in connection with FIGS. 1, 2, and 3A-3B.

The method 300 may include, at action 302, initializing the trusted execution environment (TEE). For example, the middlebox device 200 may initialize, at action 302, the TEE 202 on the middlebox device 200.

The method 300 may include, at action 304, loading a kernel application and a sensitivity policy. For example, the middlebox device 200 and/or the TEE 202 may load, at action 302, the kernel application 204 and the sensitivity policy 206 inside the TEE 202 on the middlebox device 200.

The method 300 may include, at action 306, sending, to a client device or a server device, attestation that the kernel application is authentic. In some embodiments, the sending at action 306 may further include sending, to the client device or the server device, attestation that the sensitivity policy is authentic. For example, the TEE 202 and/or the kernel application 204 may send, at action 306, attestation that the kernel application 204 and the sensitivity policy 206 inside the TEE 202 are authentic. In some embodiments, this sending at action 306 may include actually sending a hash of, and/or a copy of (e.g., if a copy is requested), the kernel application 204 and the sensitivity policy 206 (e.g., over a secure channel) so that the client device 104 and/or the server device 106 can independently verify the kernel application 204 and the sensitivity policy 206.

The method 300 may include, at action 308, receiving at the kernel application, from the client device or the server device, a symmetric session key of an encrypted network session between the client device and the server device. For example, the kernel application 204 may receive, from the client device 104 or the server device 106, at action 308, the symmetric session key 250 (e.g., over a secure channel, such as the secure channel established at action 306) (as illustrated by arrow 212) of an encrypted network session between the client device 104 and the server device 106.

The method 300 may include, at action 310, loading a logic application. For example, the middlebox device 200 may load, at action 310, the logic application 210 on the middlebox device 200 but outside of the TEE 202.

The method 300 may include, at action 312, intercepting, by the logic application, encrypted network traffic from the client device that is directed to the server device. For example, the logic application 210 may intercept, at action 312, the encrypted network traffic 252 (as illustrated by arrow 214) from the client device 104 that is directed to the server device 106.

The method 300 may include, at action 314, forwarding, from the logic application, the encrypted network traffic and, at action 316, receiving, at the kernel application, the encrypted network traffic. For example, the logic application 210 outside the TEE 202 may forward, at action 314, the encrypted network traffic 252 and the kernel application 204 inside the TEE 202 may receive, at action 316, the encrypted network traffic 252 (as illustrated by arrow 216).

The method 300 may include, at action 318, decrypting, at the kernel application, the encrypted network traffic using the symmetric session key. For example, the kernel application 204 inside the TEE 202 may decrypt, at action 318, the encrypted network traffic 252 using the symmetric session key 250.

The method 300 may include, at action 320, inspecting, at the kernel application, the decrypted network traffic according to the sensitivity policy to determine whether the decrypted network traffic includes sensitive data. For example, the kernel application 204 inside the TEE 202 may inspect, at action 320, the decrypted network traffic according to the sensitivity policy 206 to determine whether the decrypted network traffic includes any sensitive data. In some embodiments, the kernel application may also periodically receive an update to the sensitivity policy from the client device 104 or the server device 106 to modify what qualifies as sensitive data at the processing at action 320, thus allowing the client device 104 or the server device 106 (or the person or enterprise that controls each device) to dictate what qualifies as sensitive data.

The method 300 may include, at action 322, determining whether the decrypted network traffic includes sensitive data. If so (yes at action 322), the method 300 may proceed to action 323. If not (no at action 322), the method 300 may proceed to action 324.

The method 300 may include, at action 323, filtering, at the kernel application, the decrypted network traffic to exclude the sensitive data. For example, in response to determining that the decrypted network traffic includes the sensitive data 254, the kernel application 204 inside the TEE 202 may filter, at action 323, the decrypted network traffic to exclude the sensitive data 254.

The method 300 may include, at action 324, forwarding, from the kernel application, the decrypted network traffic and, at action 326, receiving, at the logic application, the decrypted network traffic. For example, the kernel application 204 inside the TEE 202 may forward, at action 326, the decrypted network traffic (as filtered to exclude the sensitive data 254, if detected) and the logic application 210 outside the TEE 202 may receive, at action 328, the decrypted network traffic (as illustrated by arrow 218).

The method 300 may include, at action 328, processing, at the logic application, the decrypted network traffic. In some embodiments, the processing at action 328 may further include modifying the decrypted network traffic. For example, the logic application 210 outside the TEE 202 may process, at action 328, the decrypted network traffic. This processing may include the logic application 210 modifying the decrypted network traffic.

The method 300 may include, at action 330, forwarding, from the logic application, the decrypted network traffic after the processing by the logic application and, at action 332, receiving, at the kernel application, the decrypted network traffic after the processing by the logic application. For example, the logic application 210 outside the TEE 202 may forward, at action 330, the decrypted network traffic after the processing by the logic application 210 and the kernel application 204 inside the TEE 202 may receive, at action 332, the decrypted network traffic after the processing by the logic application 210 (as illustrated by arrow 220).

The method 300 may include, at action 334, logging in a log, at the kernel application, the decrypted network traffic that was forwarded to the logic application. In some embodiments, the logging at action 334 may further include logging in the log the modifications made to the decrypted network traffic that was forwarded to the logic application. For example, the kernel application 204 inside the TEE 202 may log, at action 334, the decrypted network traffic that was forwarded outside the TEE 202 to the logic application 210 in the log 208, as well as logging in the log 208 any modification(s) that the logic application 210 made to the decrypted network traffic.

The method 300 may include, at action 336, forwarding, from the kernel application, the encrypted network traffic to the server device. In embodiments where the decrypted network traffic was modified during the processing at action 328, the method 300 may further include encrypting, at the kernel application, the modified decrypted network traffic, and including this newly-encrypted modified decrypted network traffic in the encrypted network traffic forwarded at action 336 (e.g., by merging the originally-encrypted data and the newly-encrypted data). For example, the kernel application 204 may forward, at action 336, the encrypted network traffic 252 to the server device 106 (as illustrated by arrow 222), which may include any modifications to the encrypted network traffic 252 made during the processing by the logic application 210.

The method 300 may include, at action 338, providing, from the kernel application, the log to the client device or to the server device. In some embodiments, the method 300 may further include auditing, at the client device or the server device, the log to determine an extent to which the decrypted network traffic was exposed outside the TEE and/or modified outside the TEE. For example, the kernel application 204 may provide, at action 338, the log 208 to the client device 104 or to the server device 106 (as illustrated by arrow 224), and the client device 104 or the server device 106 may then audit the log 208 to determine an extent to which the decrypted network traffic 252 was exposed outside the TEE 202 and/or modified outside the TEE 202.

The method 300 may thus be employed, in some embodiments, to decrypt encrypted network traffic 252 inside the TEE 202 in order to avoid exposing the sensitive data 254 within the encrypted network traffic 252 outside the TEE 202. Because the sensitive data 254, once decrypted, is maintained inside the TEE 202, and because individuals with access to the middlebox device 200, such as network administrators, are not able to access data inside the TEE 202, the middlebox device 200 may be employed in an enterprise network to improve network security and performance without risking the potential exposure of the sensitive data 254 to individuals with access to the middlebox device 200, such as network administrators. Further, the logging of all data exposed outside the TEE 202, and any modifications to the exposed data, may enable auditing of activity by individuals with access to the middlebox device 200.

Although the actions of the method 300 are illustrated in FIGS. 3A-3B as discrete actions, various actions may be divided into additional actions, combined into fewer actions, reordered, expanded, or eliminated, depending on the desired implementation. For example, in some embodiments, actions 302-306 may be performed separately from the other actions of the method 300. Also, in some embodiments, the method 300 may be performed without performing actions 334 and 338. Also, it is understood that in some embodiments the method 300 may be employed to also process decrypted network traffic travelling from the server to the client, instead of just from the client to the server. Further, in some embodiments, the loading of the logic application at action 310 may be performed in parallel with the initializing of the TEE at action 302, or at some other time prior to the completion of action 308.

Further, it is understood that the method 300 may improve the functioning of a computer system itself. For example, the functioning of the middlebox device 200 of FIG. 1 may itself be improved by the method 300. For example, the middlebox device 200 may be improved by the method 300 maintaining the sensitive data 254, once decrypted, inside the TEE 202 because individuals with access to the middlebox device 200, such as network administrators, are not able to access data inside the TEE 202. Thus, the middlebox device 200 may be employed in an enterprise network to improve network security and performance without risking the potential exposure of the sensitive data 254 to individuals with access to the middlebox device 200, such as network administrators.

Also, the method 300 may improve the technical field of middlebox processing and/or logging. Only allowing non-sensitive data in decrypted network traffic to be exposed and processed outside of the TEE 202 on the middlebox device 200 is an improvement over conventional middlebox devices which risks the potential exposure of sensitive data in network traffic by decrypting the network traffic outside of a TEE.

FIG. 4 illustrates an example computer system 400 that may be employed in decrypting network traffic on a middlebox device using a trusted execution environment. In some embodiments, the computer system 400 may be part of any of the systems or devices described in this disclosure. For example, the computer system 400 may be part of any of the client device 104 and the server device 106 of FIG. 1 and the middlebox device 200 of FIG. 1 and FIG. 2.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIGS. 3A and 3B.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIGS. 3A and 3B. These computer-executable instructions may be included, for example, in the operating system 410, in one or more applications, such as the kernel application 204 and the logic application 210 of FIG. 2, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as any one of the kernel application 204 and the logic application 210 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for decrypting network traffic on a middlebox device using a trusted execution environment, at least a portion of the method being performed by the middlebox device comprising one or more processors, the method comprising:
   (a) initializing the trusted execution environment (TEE);
   (b) loading a kernel application inside the TEE and a sensitivity policy inside the TEE;
   (c) sending, to a client device or a server device, attestation that the kernel application inside the TEE is authentic;
   (d) receiving at the kernel application inside the TEE, from the client device or the server device, a symmetric session key of an encrypted network session between the client device and the server device;
   (e) loading a logic application outside the TEE;
   (f) intercepting, by the logic application, encrypted network traffic from the client device that is directed to the server device;
   (g) forwarding, from the logic application outside the TEE to the kernel application inside the TEE, the encrypted network traffic;
   (h) decrypting, at the kernel application inside the TEE, the encrypted network traffic using the symmetric session key;
   (i) inspecting, at the kernel application inside the TEE, the decrypted network traffic according to the sensitivity policy to determine whether the decrypted network traffic includes sensitive data;
   (j) in response to determining that the decrypted network traffic includes sensitive data, filtering the decrypted network traffic to exclude the sensitive data;
   (k) forwarding, from the kernel application inside the TEE to the logic application outside the TEE, the filtered decrypted network traffic;
   (l) processing, at the logic application outside the TEE, the filtered decrypted network traffic;

(m) forwarding, from the logic application outside the TEE to the kernel application inside the TEE, the filtered decrypted network traffic after the processing by the logic application outside the TEE; and (n) forwarding, from the kernel application inside the TEE, the encrypted network traffic to the server device.

2. The method of claim 1, further comprising:

(m.1) logging in a log, at the kernel application inside the TEE, the filtered decrypted network traffic that was forwarded to the logic application outside the TEE;

(o) providing, from the kernel application inside the TEE, the log to the client device or to the server device; and (p) auditing, at the client device or the server device, the log to determine an extent to which the decrypted network traffic was exposed outside the TEE.

3. The method of claim 2, wherein:

the processing at (l) further comprises modifying the filtered decrypted network traffic; and the logging in the log at (m.1) further comprises logging in the log the modifications made to the filtered decrypted network traffic that was forwarded to the logic application outside the TEE.

4. The method of claim 3, wherein:

the method further comprises (m.2) encrypting, at the kernel application inside the TEE, the modified filtered decrypted network traffic; and the encrypted network traffic forwarded at (n) includes the modified filtered decrypted network traffic that was encrypted at (m.2).

5. The method of claim 1, wherein the sending at (c) further comprises sending, to the client device or the server device, attestation that the sensitivity policy is authentic.

6. The method of claim 1, further comprising:

(o) receiving, at the kernel application inside the TEE, an update to the sensitivity policy from the client device or the server device to modify what qualifies as sensitive data at the inspecting at (i).

7. The method of claim 1, wherein:

the kernel application is loaded at (b) inside the TEE on the middlebox device; and the logic application is loaded at (e) outside the TEE on a separate second middlebox device.

8. The method of claim 1, wherein the TEE comprises a Software Guard Extension (SGX) enclave.

9. The method of claim 8, wherein the initializing at (a) of the SGX enclave comprises initializing, at the middlebox device, of the SGX enclave using an Intel® processor of the middlebox device that supports Intel® SGX instructions.

10. The method of claim 8, wherein the initializing at (a) of the SGX enclave comprises initializing, at the middlebox device, of the SGX enclave using an OpenSGX simulator, or a Komodo monitor, that supports Intel® SGX instructions.

11. One or more non-transitory computer-readable media comprising one or more computer-readable instructions that, when executed by one or more processors of a middlebox device, cause the middlebox device to perform a method for decrypting network traffic on the middlebox device using a trusted execution environment, the method comprising:

(a) initializing the trusted execution environment (TEE);

(b) loading a kernel application inside the TEE and a sensitivity policy inside the TEE;

(c) sending, to a client device or a server device, attestation that the kernel application inside the TEE is authentic;

(d) receiving at the kernel application inside the TEE, from the client device or the server device, a symmetric session key of an encrypted network session between the client device and the server device;

(e) loading a logic application outside the TEE;

(f) intercepting, by the logic application, encrypted network traffic from the client device that is directed to the server device;

(g) forwarding, from the logic application outside the TEE to the kernel application inside the TEE, the encrypted network traffic;

(h) decrypting, at the kernel application inside the TEE, the encrypted network traffic using the symmetric session key;

(i) inspecting, at the kernel application inside the TEE, the decrypted network traffic according to the sensitivity policy to determine whether the decrypted network traffic includes sensitive data;

(j) in response to determining that the decrypted network traffic includes sensitive data, filtering the decrypted network traffic to exclude the sensitive data;

(k) forwarding, from the kernel application inside the TEE to the logic application outside the TEE, the filtered decrypted network traffic;

(l) processing, at the logic application outside the TEE, the filtered decrypted network traffic;

(m) forwarding, from the logic application outside the TEE to the kernel application inside the TEE, the filtered decrypted network traffic after the processing by the logic application outside the TEE; and (n) forwarding, from the kernel application inside the TEE, the encrypted network traffic to the server device.

12. The one or more non-transitory computer-readable media of claim 11, wherein the method further comprises:

(m.1) logging in a log, at the kernel application inside the TEE, the filtered decrypted network traffic that was forwarded to the logic application outside the TEE;

(o) providing, from the kernel application inside the TEE, the log to the client device or to the server device; and (p) auditing, at the client device or the server device, the log to determine an extent to which the decrypted network traffic was exposed outside the TEE.

13. The one or more non-transitory computer-readable media of claim 12, wherein:

the processing at (l) further comprises modifying the filtered decrypted network traffic; and the logging in the log at (m.1) further comprises logging in the log the modifications made to the filtered decrypted network traffic that was forwarded to the logic application outside the TEE.

14. The one or more non-transitory computer-readable media of claim 13, wherein:

the method further comprises (m.2) encrypting, at the kernel application inside the TEE, the modified filtered decrypted network traffic; and the encrypted network traffic forwarded at (n) includes the modified filtered decrypted network traffic that was encrypted at (m.2).

15. The one or more non-transitory computer-readable media of claim 11, wherein the sending at (c) further comprises sending, to the client device or the server device, attestation that the sensitivity policy is authentic.

16. The one or more non-transitory computer-readable media of claim 11, wherein the method further comprises:

(o) receiving, at the kernel application inside the TEE, an update to the sensitivity policy from the client device or the server device to modify what qualifies as sensitive data at the inspecting at (i).

17. The one or more non-transitory computer-readable media of claim 11, wherein:
   the kernel application is loaded at (b) inside the TEE on the middlebox device; and
   the logic application is loaded at (e) outside the TEE on a separate second middlebox device.

18. The one or more non-transitory computer-readable media of claim 11, wherein the TEE comprises a Software Guard Extension (SGX) enclave.

19. The one or more non-transitory computer-readable media of claim 18, wherein the initializing at (a) of the SGX enclave comprises initializing, at the middlebox device, of the SGX enclave using an Intel® processor of the middlebox device that supports Intel® SGX instructions.

20. The one or more non-transitory computer-readable media of claim 18, wherein the initializing at (a) of the SGX enclave comprises initializing, at the middlebox device, of the SGX enclave using an OpenSGX simulator, or a Komodo monitor, that supports Intel® SGX instructions.

* * * * *